US008527546B2

(12) United States Patent
Raatikka

(10) Patent No.: US 8,527,546 B2
(45) Date of Patent: Sep. 3, 2013

(54) GENERATING A CHECKPOINT IMAGE FOR USE WITH AN IN-MEMORY DATABASE

(75) Inventor: Vilho T. Raatikka, Espoo (FI)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/222,581

(22) Filed: Aug. 31, 2011

(65) Prior Publication Data
US 2012/0136901 A1 May 31, 2012

(30) Foreign Application Priority Data
Nov. 25, 2010 (EP) .................................. 10192503

(51) Int. Cl.
G06F 17/30 (2006.01)
(52) U.S. Cl.
USPC ..................................... 707/797; 707/E17.05
(58) Field of Classification Search
None
See application file for complete search history.

(56) References Cited

U.S. PATENT DOCUMENTS

| 6,226,634 | B1 * | 5/2001 | Ogihara et al. ........... 1/1 |
|---|---|---|---|
| 6,522,632 | B1 | 2/2003 | Waters et al. |
| 6,859,808 | B1 | 2/2005 | Chong et al. |
| 7,065,537 | B2 | 6/2006 | Cha et al. |
| 7,146,371 | B2 | 12/2006 | Hofstee et al. |
| 7,363,284 | B1 | 4/2008 | Plasek et al. |
| 7,539,153 | B1 | 5/2009 | Liang et al. |
| 7,587,429 | B2 | 9/2009 | Liedes et al. |
| 7,725,440 | B2 | 5/2010 | Reed et al. |
| 7,797,296 | B2 | 9/2010 | Cha et al. |
| 7,809,736 | B2 | 10/2010 | Greenwald et al. |
| 7,895,164 | B1 | 2/2011 | Varadarajan et al. |
| 8,151,060 | B2 | 4/2012 | Mizushima |
| 8,332,410 | B2 | 12/2012 | Shinjo et al. |
| 8,417,885 | B2 | 4/2013 | Chou et al. |
| 2002/0184231 | A1 | 12/2002 | Baskins et al. |
| 2003/0217080 | A1 | 11/2003 | White et al. |
| 2004/0139127 | A1 | 7/2004 | Pofelski |
| 2004/0260726 | A1 | 12/2004 | Hrle et al. |
| 2005/0027743 | A1 | 2/2005 | O'Neil et al. |
| 2006/0004860 | A1 | 1/2006 | Liedes et al. |
| 2006/0047925 | A1 | 3/2006 | Perry |
| 2006/0101033 | A1 | 5/2006 | Hu et al. |
| 2007/0220356 | A1 | 9/2007 | Ruscio et al. |
| 2008/0168077 | A1 | 7/2008 | Barsness et al. |
| 2009/0012976 | A1 | 1/2009 | Kang et al. |
| 2009/0077076 | A1 | 3/2009 | Berger et al. |
| 2009/0083339 | A1 | 3/2009 | Reed et al. |
| 2009/0307184 | A1 | 12/2009 | Inouye et al. |
| 2009/0307277 | A1 | 12/2009 | Grubov et al. |
| 2010/0011026 | A1 | 1/2010 | Saha et al. |
| 2010/0042597 | A1 | 2/2010 | Shinjo et al. |

(Continued)

OTHER PUBLICATIONS

Camargos, Lasaro, et al., "On-Demand Recovery in Middleware Storage Systems". 29th IEEE Symposium on Reliable Distributed Systems (SRDS 2010), New Delhi, Punjab, India, Oct. 31-Nov. 3, 2010. pp. 204-213.

(Continued)

Primary Examiner — Anteneh Girma
(74) Attorney, Agent, or Firm — Marcia L. Doubet

(57) ABSTRACT

Additional information is provided in a checkpoint image such that direct pointers can be included in the checkpoint image. Thus, an in-memory database management system can be restored from the checkpoint image in the event of a failure without causing any significant performance drawbacks to the database management system.

10 Claims, 8 Drawing Sheets

(56) References Cited

U.S. PATENT DOCUMENTS

| | | |
|---|---|---|
| 2010/0235335 A1 | 9/2010 | Heman et al. |
| 2011/0138123 A1 | 6/2011 | Gurajada et al. |
| 2011/0153979 A1 | 6/2011 | Boyle |
| 2012/0166490 A1 | 6/2012 | Raatikka |
| 2012/0323971 A1 | 12/2012 | Pasupuleti |
| 2013/0013602 A1 | 1/2013 | Manner et al. |
| 2013/0013890 A1 | 1/2013 | Manner et al. |

OTHER PUBLICATIONS

Xiong, Ying, et al., "Memory Integrity Verification Speedup Using Separated L2 Hash code". Proc. of Theoretical and Applied Computer Science (TACS), Stillwater, OK, Nov. 2010. pp. 1-6.

Goyal, Prof. Navneet, "Crash Recovery". Department of Computer Science & Information Systems, BITS, Pilani. Sep. 2008. 40 pages.

Lee, Ig-hoon, et al., "A Snappy B+-Trees Index Reconstruction for Main-Memory Storage System". Computational Science and Its Applications—ICCSA 2006, International Conference, Glasgow, UK, May 8-11, 2006, Proceedings, Part I. pp. 1036-1044.

Markku J. Manner et al., U.S. Appl. No. 13/421,885, filed Mar. 16, 2012, Office Action, Jan. 10, 2013, 10 pages.

Markku J. Manner et al., U.S. Appl. No. 13/462,815, filed May 3, 2012, Office Action, Jan. 15, 2013, 16 pages.

Markku J. Manner et al., U.S. Appl. No. 13/421,885, filed Mar. 16, 2012, Office Action, Apr. 23, 2013, 14 pages.

Markku J. Manner et al., U.S. Appl. No. 13/462,815 , filed May 3, 2012, Office Action, May 16, 2013, 23 pages.

* cited by examiner

GENERATING A CHECKPOINT IMAGE FOR USE WITH AN IN-MEMORY DATABASE

BACKGROUND

The invention relates to database management systems. In particular, the invention relates to an in-memory database management system (DBMS) and checkpointing an in-memory database using direct memory references between indexes and logically clustered tuples.

A database management system (DBMS) is an application for storing large volumes of data and allowing multiple users to access and manipulate the data in an efficient and controlled fashion. Databases are traditionally considered as a large collection of mainly disk resident shared data, managed and accessed by the DBMS.

Another type of database management system is an in-memory database (IMDB) management system or a main memory database system. This type of database management system comprises random access memory (RAM) as its main working memory for storing data and disk storage for backing up the data held in memory. Compared to the disk based database management systems, in-memory database systems offer superior performance by offering shorter access times. Storage disks are block-oriented meaning that reading and writing a relatively large amount of data has the same high cost as reading or writing a single byte.

In-memory database systems use a technique called 'checkpointing' in order to reduce the recovery time of the database in the presence of a failure of the database.

The purpose of checkpointing is to provide a snapshot of the data within the database. A checkpoint, in general, is any identifier or other reference that identifies, at a point in time, the state of the database. Modifications to database pages are performed in memory and are not necessarily written to disk after every update. Therefore, periodically, the database system must perform a checkpoint to write theses updates which are held in-memory to the storage disk. Writing these updates to storage disk creates a point in time in which the database system can apply changes contained in a transaction log during recovery after an unexpected shut down or crash of the database system. If a checkpoint is interrupted and a recovery is required, then the database system must start recovery from a previous successful checkpoint.

Checkpointing can be either transaction-consistent or non-transaction-consistent (called also fuzzy checkpointing). Transaction-consistent checkpointing produces a persistent database image that is sufficient to recover the database to the state that was externally perceived at the moment of starting the checkpointing. A non-transaction-consistent checkpointing results in a persistent database image that is insufficient to perform a recovery of the database state. To perform the database recovery when using non-transaction-consistent checkpointing, additional information is needed, typically contained in transaction logs.

Transaction consistent checkpointing refers to a consistent database, which doesn't necessarily include all the latest committed transactions, but all modifications made by transactions, that were committed at the time checkpoint creation was started, are fully present. A non-consistent transaction refers to a checkpoint which is not necessarily a consistent database, and can't be recovered to one without all log records generated for open transactions included in the checkpoint.

Depending on the type of database management system implemented, a checkpoint may incorporate indexes or storage pages (user data), indexes, and storage pages. If no indexes are incorporated into the checkpoint, indexes must be created when the database is restored from the checkpoint image.

Storage pages are a collection of database rows called 'tuples'. Tuples are ordered by the primary key, grouped to logical storage pages, and pointed to by index entries by using direct pointers. During a database checkpoint, storage pages including one or more modified tuples are copied to a 'checkpoint buffer', which has a size that is a multiple of page size, for disk write operations.

If indexes were included in the checkpoint, the direct pointers (direct memory references) would become invalid if they were copied to a checkpoint image as such, because they would point to memory segments in volatile memory, i.e. RAM, which are lost when a database process terminates.

In order to maintain the validity of the pointers of the index structures in a checkpoint image, the pointers would have to be updated to refer to the corresponding memory segments in the checkpoint image instead of referring to those in volatile memory, and this would have to be done before checkpointing the index itself. This would require updating both internal pointers of indexes, and pointers from every index referring to every tuple included in the checkpoint image.

Therefore, checkpointing indexes in databases which use direct tuple pointers is a very expensive operation because tuples are often referred to by multiple indexes.

Therefore, many prior art in-memory database management systems are forced to use indirect pointers between index entries and tuples.

Another solution is not to include indexes in the checkpoint image at all but to recreate the indexes as part of the restore process by extracting key values from tuples as they are read from the checkpoint image, and inserting all key values to corresponding indexes.

U.S. Pat. No. 7,587,429 discloses a page consistent checkpointing method for a computer system, and involves altering data objects of pages in primary storage, identifying pending data objects, and altering pending data objects after writing data objects into secondary storage. However, this disclosure does not address the problems discussed above.

BRIEF SUMMARY

Viewed from a first aspect, an embodiment of the present invention generates a checkpoint image of storage pages of an in-memory database system, comprising: identifying one or more storage pages which have been modified but not incorporated into a previous checkpoint image; for each identified storage page, identifying a direct memory reference and its offset which correspond to a secondary storage location; for each identified storage page, identifying one or more leaf nodes of a primary index and a secondary index and a memory address of each database table row identified in each of the identified leaf nodes; for each of the identified memory addresses of each database table row, identifying a relation identifier of a database table of each of the database rows; and writing the identified direct memory reference, its offset, relation identifier, and leaf nodes of the primary and secondary indexes to a checkpoint image. Advantageously, by including direct pointers in the checkpoint image, an in-memory database management system can be restored from the checkpoint image in the event of a failure without causing any significant performance drawbacks to the database management system. The additional navigation information is preferably provided by a relation identifier, a row address translation table, and a disk address array. Preferably, the identified relation identifiers are stored in a relation identifier directory. The relation identifier directory, the row address translation table, and the index leaf node pages are preferably stored in the checkpoint image. A disk array may be used for storing the offsets of the direct memory addresses.

Viewed from another aspect, an embodiment of the present invention may be provided as a computer program comprising computer program code to, when loaded into a computer system and executed, carry out techniques disclosed herein. Or, an embodiment of the present invention may be provided as a system in yet another aspect.

BRIEF DESCRIPTION OF THE SEVERAL VIEWS OF THE DRAWINGS

Embodiments of the invention will now be described, by way of example only, with reference to the accompanying drawings in which.

DETAILED DESCRIPTION

An embodiment of the present invention provides a way in which to incorporate direct pointers into a checkpoint image without increasing processing requirements.

Figure 1:
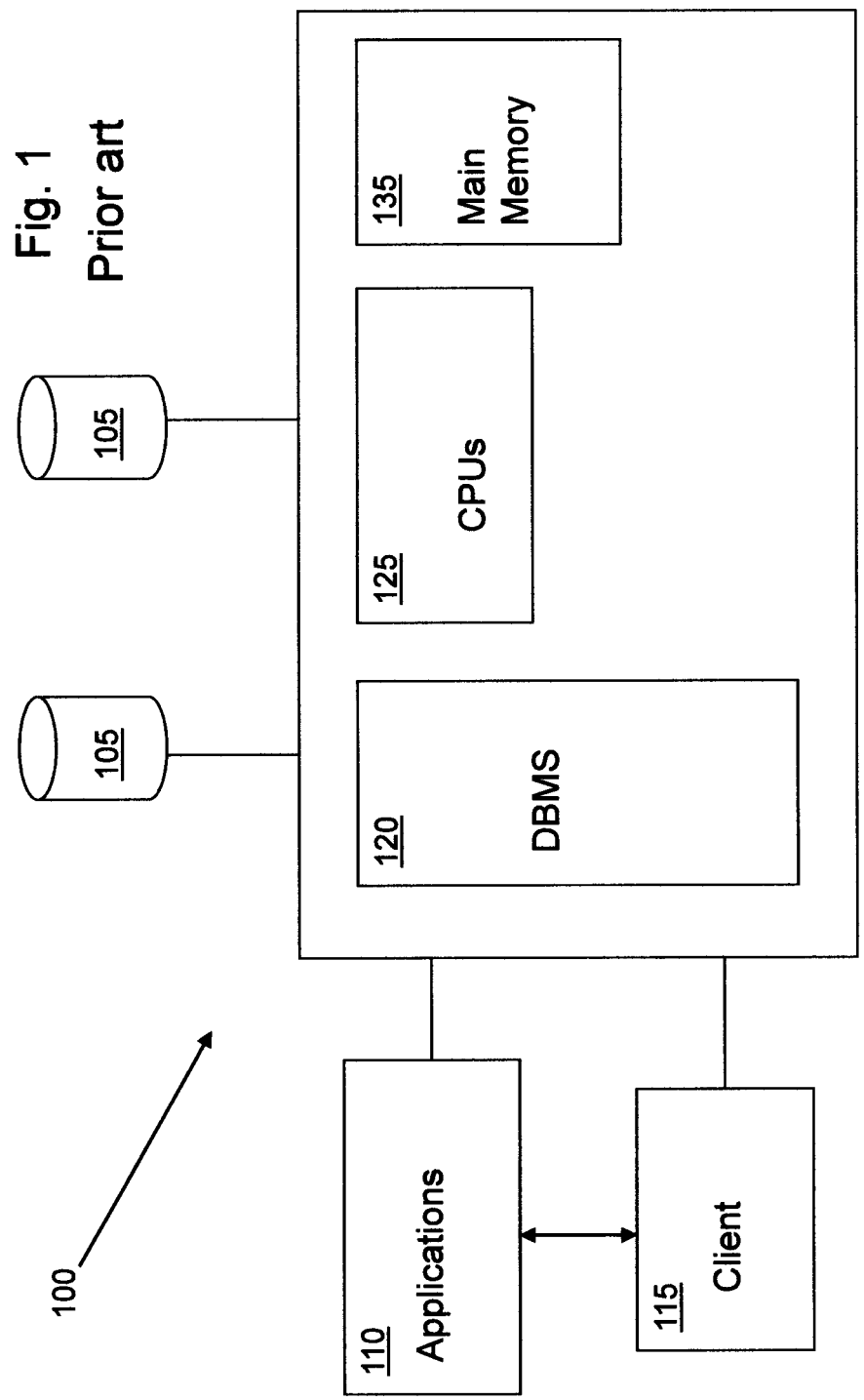
FIG. 1 is a block diagram illustrating an in-memory database management system operable on a data processing apparatus as is known in the art.

FIG. 1 details an environment 100 in which an in-memory database management system 120 is operable on a data processing system 100 as in known in the art. The in-memory database management system 120 allows one or more users to access a database concurrently. A user can be an end user who interacts with the database management system 120 from a client side workstation 115 through an online application 110 or an interface provided by the in-memory database management system 120.

Figure 2:
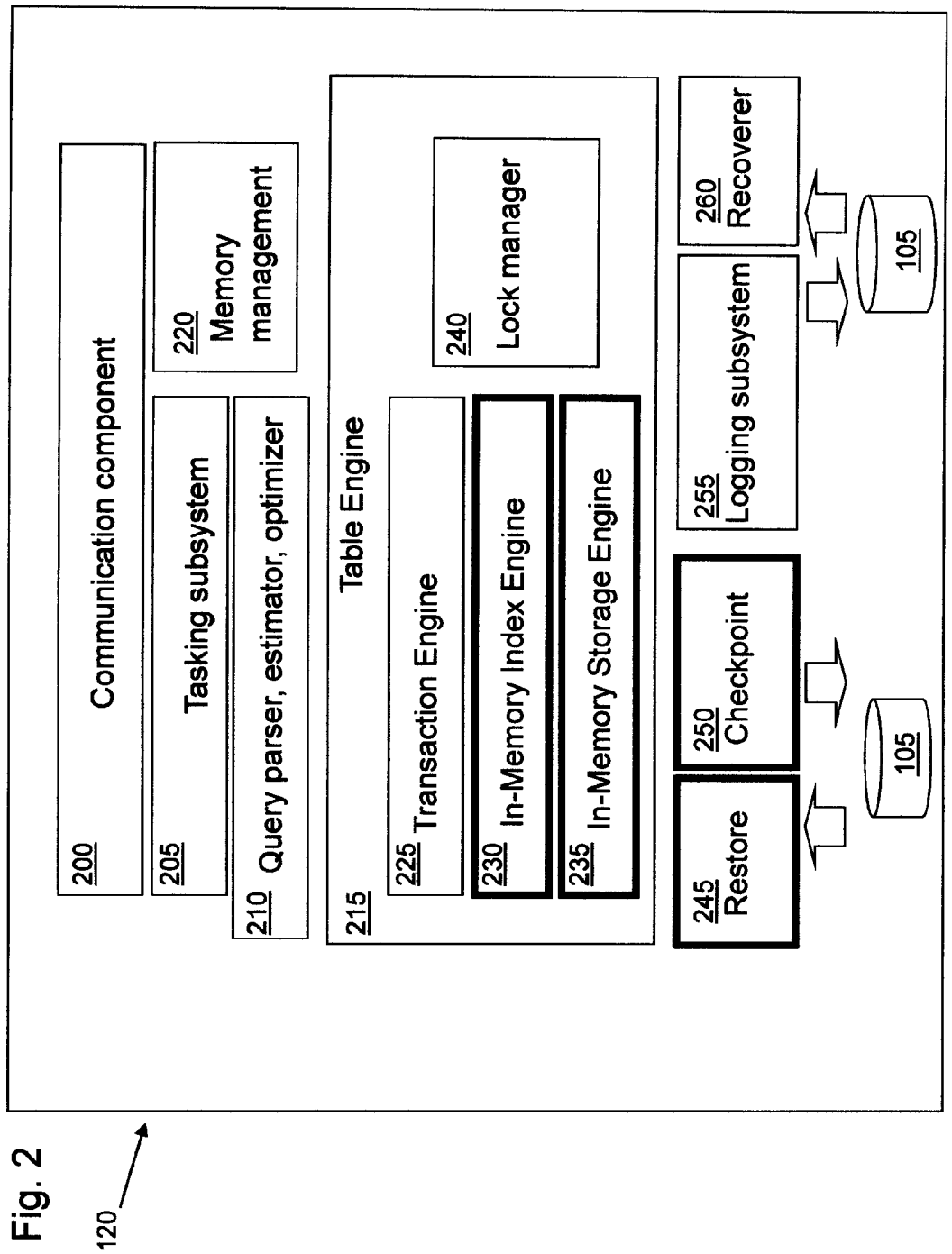
FIG. 2 is a block diagram illustrating an in-memory database management system in accordance with a preferred embodiment of the present invention.

The database management system 120 comprises a number of hardware and software components which interact with each other in order to query, retrieve, and store user requests. Hardware components are depicted in FIG. 1 and software components are depicted in FIG. 2.

The hardware components form the computing platform in which the database management system 120 resides and operates, i.e. a server which is accessible, for example, across a network. These hardware components comprise main memory 135, secondary storage volumes 105, I/O devices, device controllers, I/O channels, and CPUs 125, etc.

Main memory 135 is in the form of random access memory (RAM) and is used as a primary storage unit where all data is stored 'in-memory'. Database files are contained within a database file unit and transaction logs provide a persistent backup of the data in the database. In this application, the term RAM means main memory and is the primary storage unit. Secondary storage 105 is provided by secondary storage volumes such as disk storage. However, it will be obvious to a person skilled in the art that disk storage is not the only technological means in which to implement persistent storage.

Secondary storage volumes 105, such as magnetic disk storage, are used to back up data and store checkpoint information and logging information. Data may be backed up onto one or a plurality of secondary storage volumes 105. The secondary storage volumes 105 may be directly connectable to the database system 120 or connectable and accessed across a network.

Therefore, in an in-memory database management system 120, the data resides in RAM 135 and the data is backed up to a secondary storage volume 105.

Figure 3:
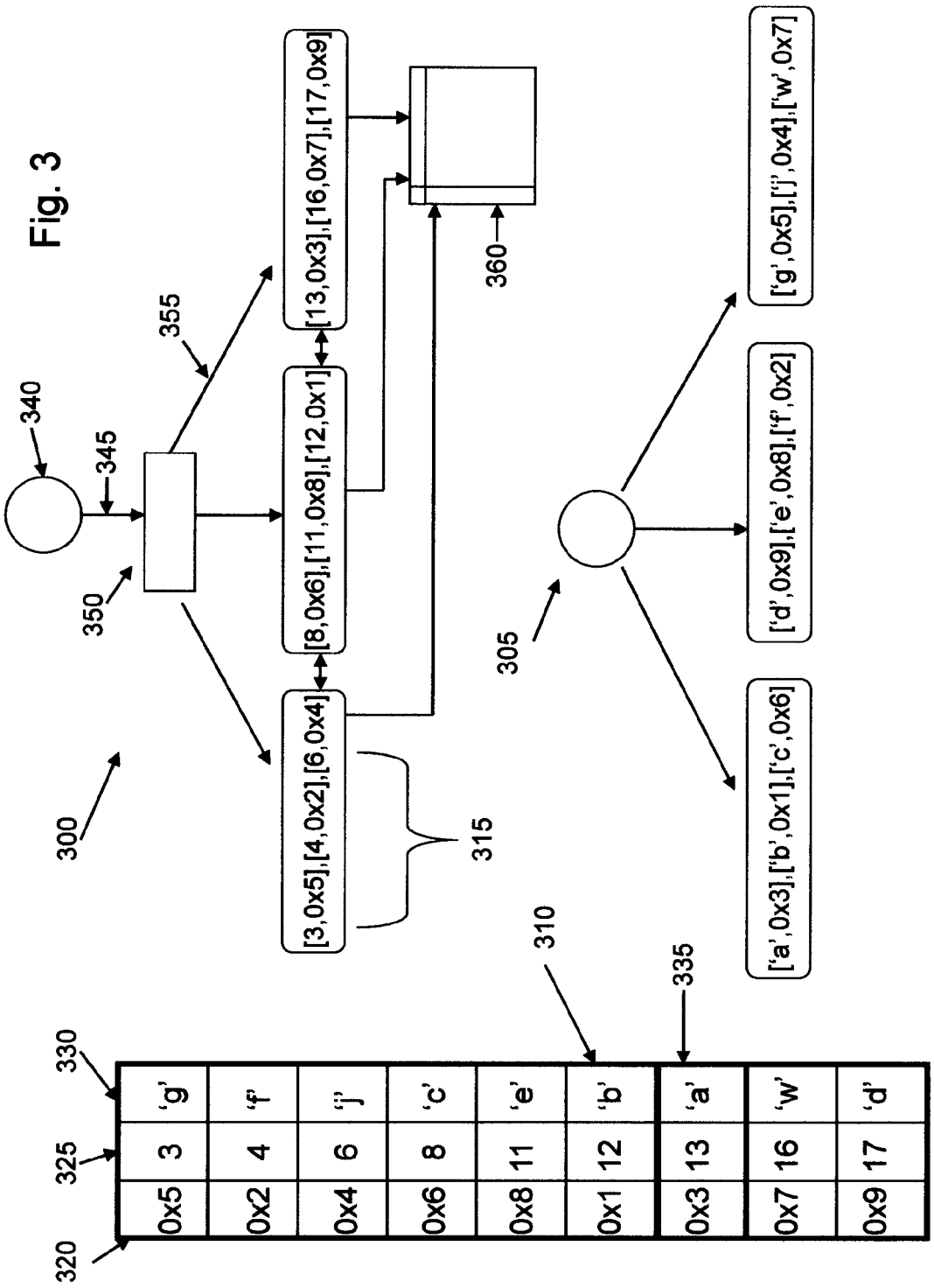
FIG. 3 is a block diagram illustrating a database table and a primary and secondary index derived from the database table in accordance with a preferred embodiment of the present invention.
Figure 4:
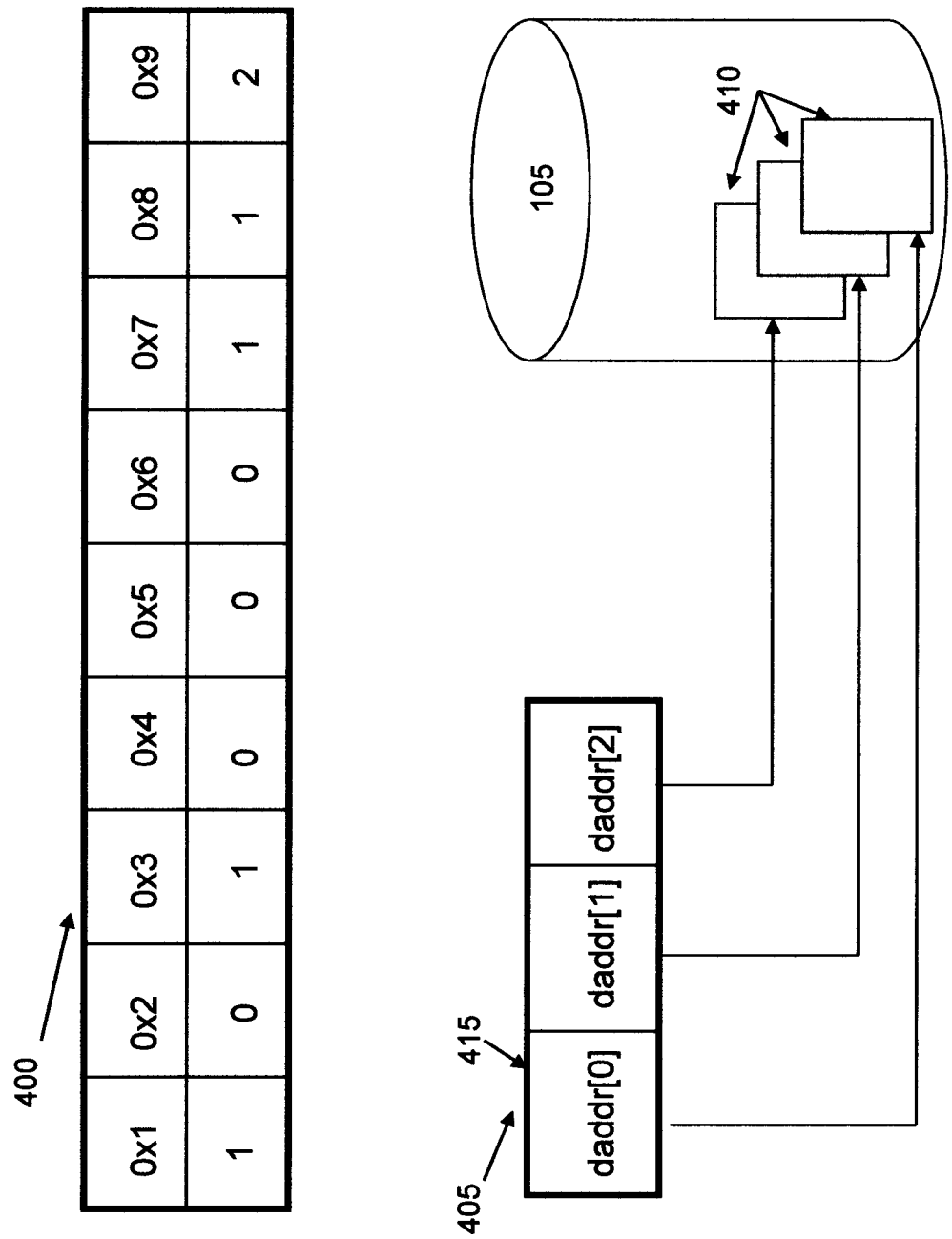
FIG. 4 is a block diagram illustrating a row address translation table and disk address array at the moment when storage pages and leaf node pages are written to a checkpoint image, in accordance with a preferred embodiment of the present invention.
Figure 5:
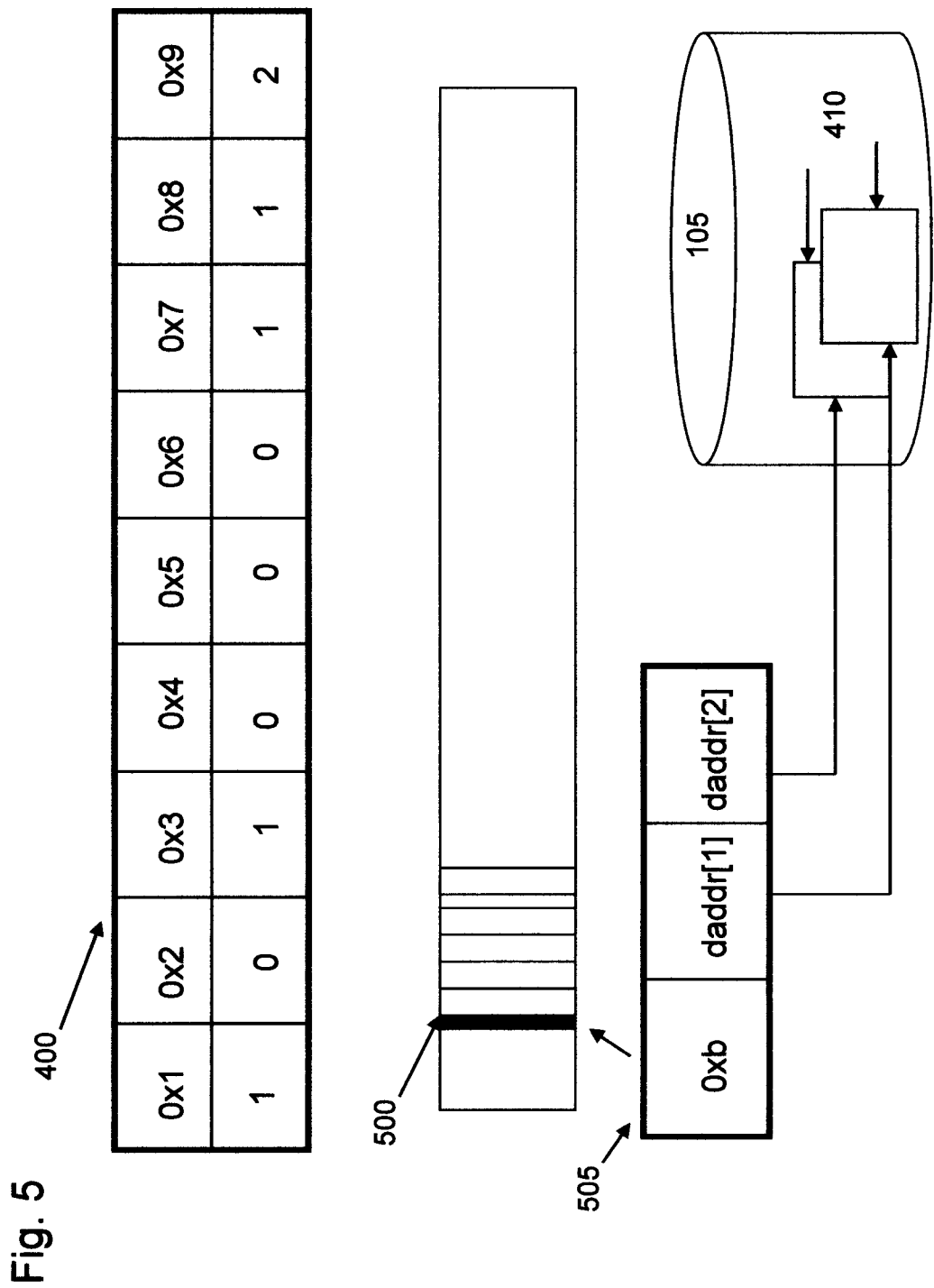
FIG. 5 is a block diagram illustrating the disk address array when a first storage page is constructed to address 0xb0 in main memory in accordance with a preferred embodiment of the present invention.
Figure 6:
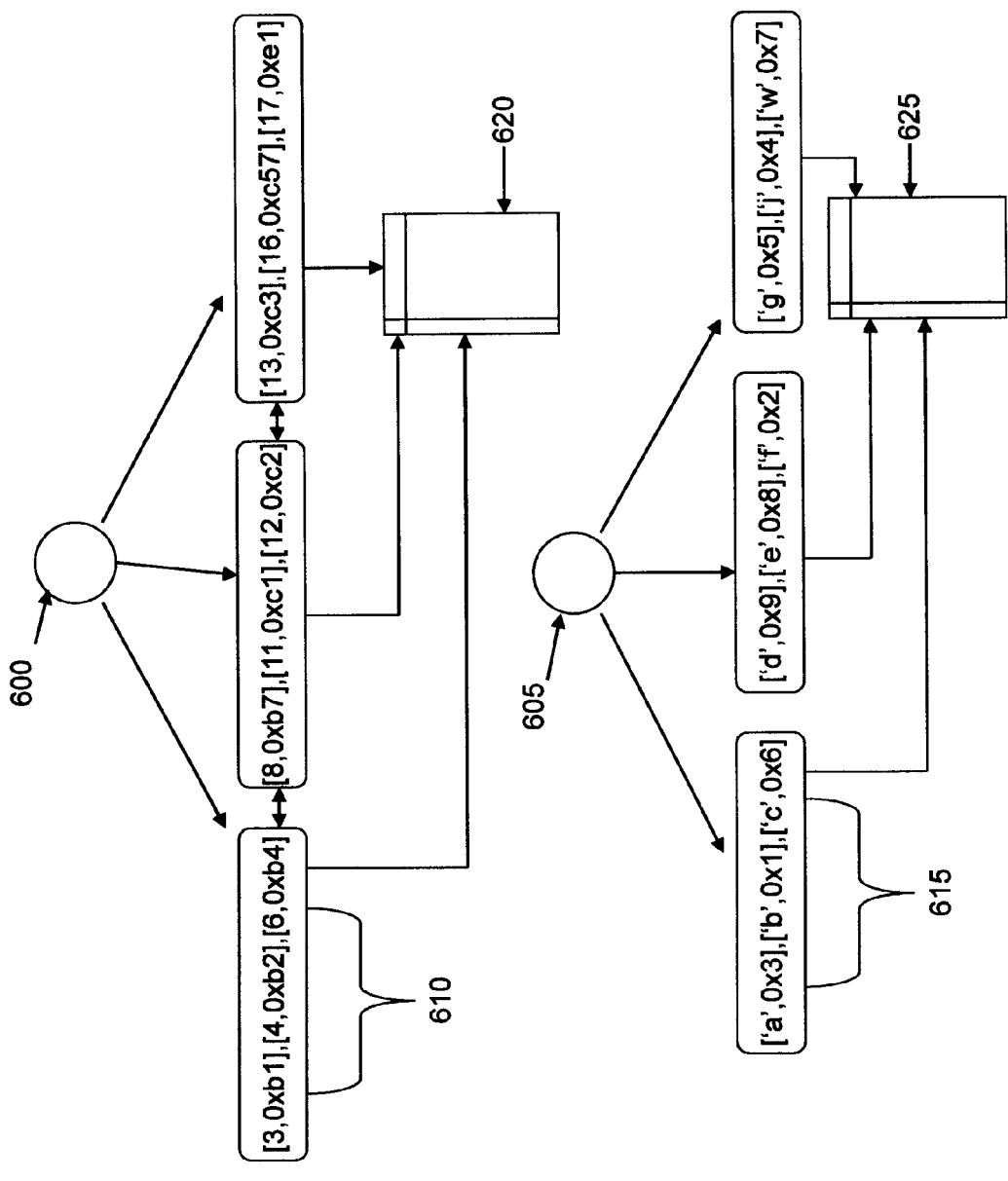
FIG. 6 is a block diagram illustrating a primary and secondary index in accordance with a preferred embodiment of the present invention.
Figure 7:
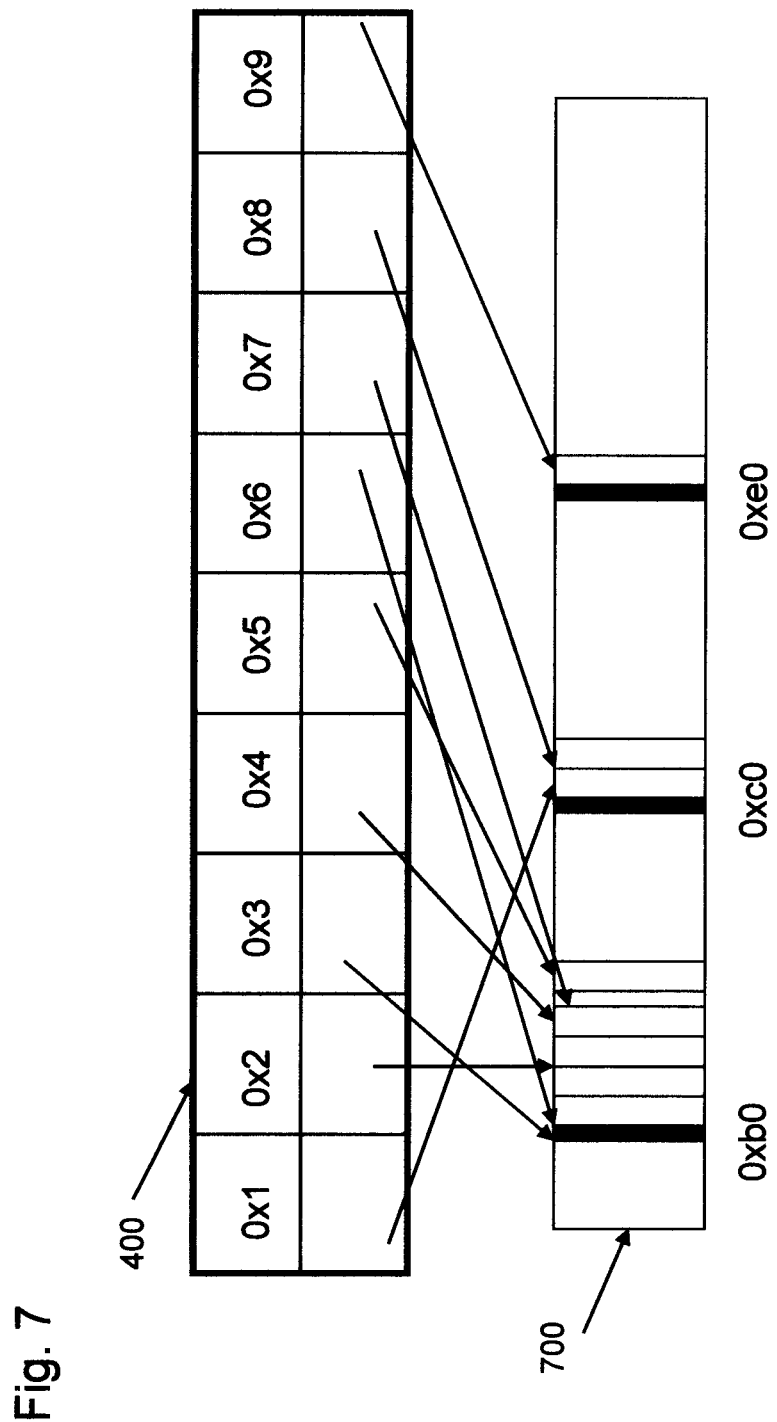
FIG. 7 is a block diagram illustrating a row address translation table and corresponding storage pages when constructed in memory in accordance with a preferred embodiment of the present invention.
Figure 8:
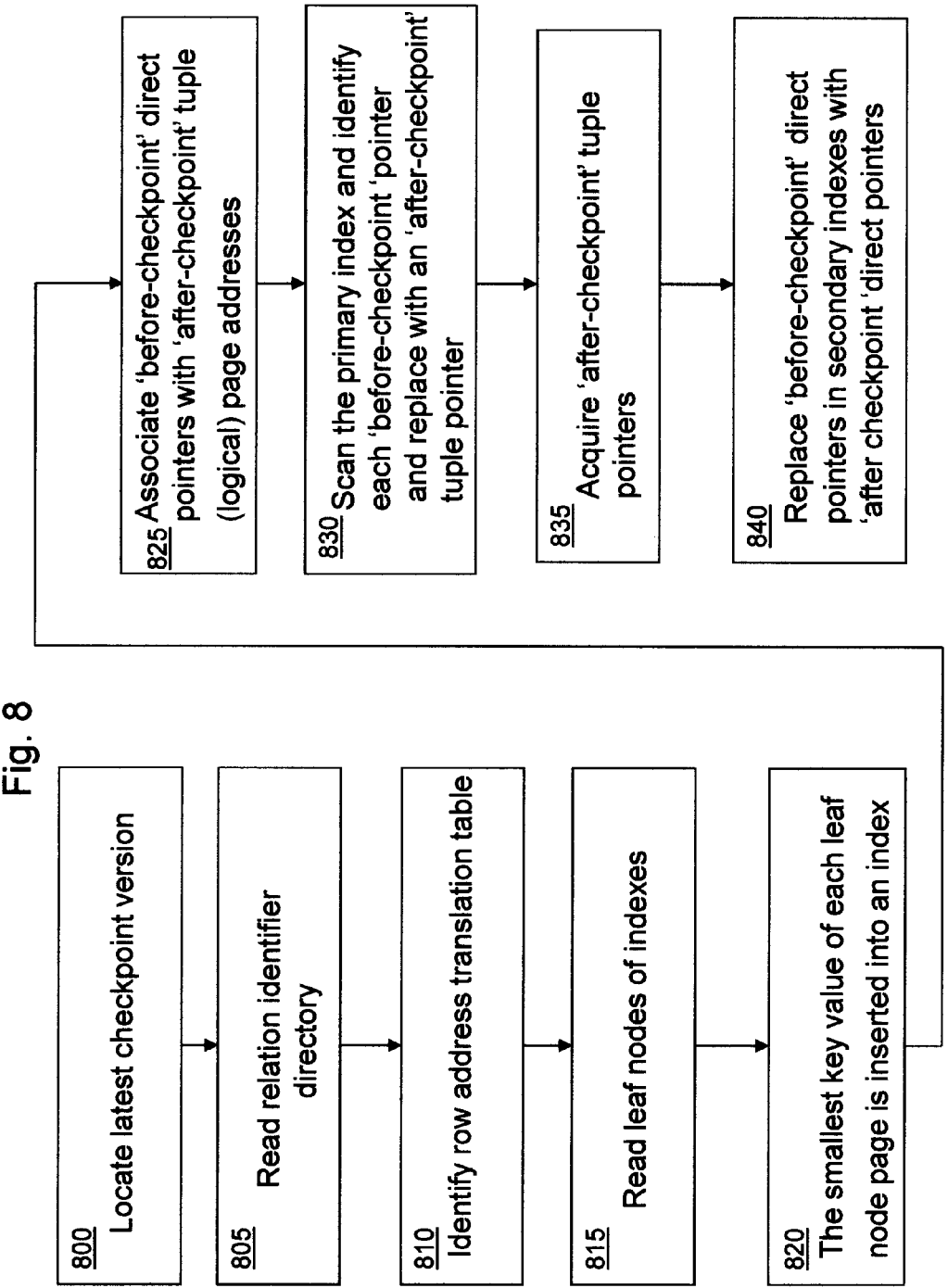
FIG. 8 is a flow chart illustrating the method steps carried out by the in-memory database management system during a restore operation in accordance with a preferred embodiment of the present invention.

Referring to FIGS. 2, 3, and 4, a communication component 200 receives requests from users for data stored in one or more of the databases. A request received from a user is in the form of a query in a query language specified by the database management application, for example, a structured query language, such as SQL. The communication component 200 also receives the results of the query for transmitting back to the requesting user 115.

A query parser, estimator, and optimiser component 210 receives a query from the communication component 200, transforms the query into a set of actions, and determines the optimal strategy for executing the query. A query can comprise both read and update operations or only a single type of operation.

A tasking subsystem 205 provides a means to receive tasks requested by users 115 (clients) and if necessary, to split the received tasks into sub tasks and assign the sub tasks to server threads. This allows the database system to serve all user requests and avoid any users from starvation. Alternatively, a client/thread model is deployed in which each client request is served with a single thread. Thus each client task is executed continuously from the beginning to the end of the assigned task.

A memory management component 220 receives memory allocations and memory release requests from an in-memory engine (not shown). There is typically a plurality of memory managers 220 assigned to different types of requests in order to satisfy a large number of simultaneous requests.

A table engine 215 comprises a transaction engine 225, an in-memory index engine 230, an in-memory storage engine 235, and a lock manager 240. The purpose of the table engine 215 is to manage all of the database tables and indexes of the database management system 120.

The transaction engine 225 receives inputs from the query parser component 210 and creates transactions from the input. For example, the input may comprise a query written in SQL, for example (INSERT INTO TAB1 VALUES (1,'John');). The transaction engine 225 decomposes the statements to ensure that there is no row with identifier '1' already in the database, and inserts the key '1' into the index and the row into storage.

A logging subsystem component 255 records all of the modifications to the data stored in RAM 135 and writes the modifications to the secondary storage 105. Logs are used to ensure that a consistent database can be recovered even if the database image is not available.

The lock manager 240 provides a shared and exclusive lock for client threads that need to perform protected operations to the data stored in the database. A requesting client thread must acquire a lock to a row—it is the row that is exclusively locked for the client thread for the duration of operation before its execution is permitted. Such a client thread acquires a lock name by using a primary key of the row, for example. Then the client requests the lock from the lock manager 240 for the lock name.

The modified in-memory index engine 230 provides one or more indexes for each database table which is held in memory 135.

FIG. 3 illustrates two types of indexes, namely primary and secondary, and how these indexes are derived from a database table.

A simplified database table 310 is shown, having columns that comprise a memory address 320 (shown in the figure using the notation 0x followed by a 1-digit value) and two attributes 325, 330. The first attribute 325 is numeric, and is also the primary key attribute. The second attribute 330 is of character type, and is indexed by the secondary index. For example, the data attribute 'g' comprises a primary key attribute of the value '3' and has a memory address of '5' (and accordingly, the hexadecimal value of the memory address is shown in the figure as '0x5') and the data attribute T has a primary key attribute of the value '6' and has a memory address of '4'.

Typically, every database table 310 has a user-specified primary key attribute 325, which can consist of one or multiple attributes. The primary key attribute 325 must be unique among the rows in the table. If there is no user-defined primary key attribute 325, typically the database management system generates an identifier for each row in the table.

A primary index 300 comprises a number of values, namely the primary key attribute 325 and a memory address 320 of where the database row 335 is located in memory 135. Each of these values is held in a leaf node 315, and a plurality of leaf nodes form a leaf node page 360 of a specified page size.

The secondary index 305 comprises the secondary key attribute 330 and its associated pointer to the memory address 320. During the checkpoint operation, row addresses and offsets to their corresponding disk page number in the disk array are stored in a row address translation table 400. (See FIG. 4.)

For example, the attribute 330 may be a customer name and the attribute 325 may be a customer ID. In this example, each row 335 in a customer table 310 comprises two attributes, namely name 330 and a primary key identifier. The primary key identifier is used as an identifier for each customer listed in the table (each row of data). When a new customer is inserted into the database table 310, the new row must at least have a primary key attribute 325. The row is stored in tuple storage and the primary key attribute is stored/inserted into a primary index 300 and then the name of the customer is inserted into a secondary index 305. Both the primary and the secondary indexes are transient, except their leaf nodes 315, which are stored in the checkpoint image 410.

Typical indexes are tree-like data structures or hash function-based indexes (hash indexes). A typical tree-like structure is a 'B+-tree'. Each tree-like data structure comprises a root, branches, and leaf nodes. The root node 340 may be either a leaf node 315 or a node having two or more children. Internal nodes (i.e., not leaf nodes) may comprise between v and 2v keys and a node with k keys has k+1 children. Leaves are always on the same level of a branch.

Nodes that do not have any child nodes are termed as leaf nodes, i.e., terminal nodes. An internal node is any node of the tree that has one or more child nodes.

Leaf nodes comprise one or more key values, and pointers 355, 345. Pointers 355 and 345 are internal pointers of the primary index. Every memory address (that is, the notation '0x' followed by a hexadecimal value) in each of the leaf nodes is a row/tuple pointer referring to a memory address where the row is located.

A root node 340 comprises node pointers 345 to branch nodes 350. A branch node 350 comprises pointers 355 to leaf nodes 315 or to other branch nodes. A leaf node 315 comprises index keys, pointers to database rows, and horizontal pointers to other leaf nodes.

A leaf node page 360 is a page including one or more leaf nodes 315. This is because leaf nodes 315 in in-memory database management systems are typically smaller than disk pages. For example, some types of in-memory database have a node size of 512 bytes and a default page size of 16 kilobytes.

Storage pages are collections of database rows called 'tuples'. Tuples are ordered by the primary key, grouped to logical storage pages, and pointed to by index entries by using direct pointers. During a database checkpoint, the storage pages including one or more modified tuples are copied to a page size memory buffer called a 'checkpoint buffer' for disk write operations.

In accordance with a preferred embodiment of the invention, a modified checkpoint component 250 communicates with the in-memory index engine 230, the in-memory storage engine 235, and the table engine 215 to generate and write a checkpoint image 410 of a database to a secondary storage medium 105. A checkpoint is typically created when a database is open and active.

The modified checkpoint component 250 performs a process whereby altered storage pages are written from one storage unit, such as RAM 135, to another storage unit such as disk 105. Typically, the end-result of a checkpoint is a snapshot 410 of a database on the disk 105.

The in-memory index engine 230 associates a global checkpoint counter with each database or database instance stored on the server and the global checkpoint counter is incremented by the value of 'one' each time a new checkpoint operation commences.

A copy of the global checkpoint counter is also associated with each leaf node page.

If the copy of the global checkpoint counter associated with each leaf node page 360 equals that of the global checkpoint counter, then the index has already been checkpointed, i.e. its altered leaf node pages 360 are already copied to the checkpoint buffer for disk write. However, if the copy of the global checkpoint counter in a leaf node page 360 comprises a value which is smaller than that of the value of the global checkpoint counter, the leaf node page 360 has not been checkpointed.

The in-memory index engine 230 is responsible for providing a global access controlling mechanism, for example a global gate. Entering the global gate ensures that there are no further updates to any of the database tables. Each time a database is checkpointed, the checkpointing operation enters the global gate in an exclusive mode, thus preventing any updates to the tables. This process is called a checkpoint freeze.

The modified checkpoint component 250, during a checkpoint freeze operation, prevents updates to any of the indexes and pages. The modified checkpoint component 250 sets a mark to tables and indexes which include modified data before releasing the global gate. The modified checkpoint component 250 in conjunction with the in-memory storage engine 235 writes the 'dirty' pages 360 (i.e., pages that have been updated but not incorporated into any checkpoint image) for storage to a checkpoint buffer, and internal index pointers 355, 345 and offsets pointing to their corresponding relative disk page locations are collected and written to a row address translation table.

An internal index pointer 355, 345 is a direct memory reference to either an internal node or a leaf index node. An offset is a location relative to the beginning of a location in a disk address array. If, for example, there is an address '0x12345' having an offset value of 2 in a row address table, this means that the row in memory position '0x12345' has a copy in the checkpoint image and the actual disk address of the copy is the third from the beginning of the disk address array. Two's offset means two steps forward from the beginning Row pointers are hexadecimal addresses in leaf nodes.

A row address translation table 400 translates the row addresses (i.e., addresses in RAM) to secondary storage disk addresses after checkpointing. The row address translation table 400 is stored and managed by the in-memory index engine 230.

Disk page addresses 415 are stored in an ordered array. (An array is a continuous memory area where 4-byte disk addresses are stored next to each other, and this is where offsets in the row address translation table 400 point.)

Disk address array pages 415 are also incorporated into the checkpoint image 410. Leaf node pages' relation identifiers and disk addresses are stored in a relation identifier directory.

Database rows are written to the checkpoint image 410 as pages equal in size to the disk block. Every page has rows from the same table.

A relation identifier is a value that identifies one database table from another. The table engine 215 generates the relation identifier for each table at the time a new table is created. When leaf node pages (of indexes) are written to a checkpoint image, the relation identifier and the target address of the newly created table are stored into a relation identifier directory.

The relation identifier directory is incorporated into the checkpoint image and this directory is used when the database is being restored to find leaf node pages of indexes of tables.

When all necessary pages are copied to disk, the relation identifier directory itself is copied to disk, thus becoming part of the checkpoint image 410.

Also for incorporation into the checkpoint image 410 is a row address translation table 400 which comprises direct row pointers and their offsets which point to their corresponding relative disk page locations. The row address translation table 400 is collected when leaf nodes 315 are copied for checkpointing. Each row address that is stored in a leaf node 315 is copied to row address translation table 400 and the disk page address is copied to the disk address array 405.

The offset of the disk page address 415 in the disk address array 405 is copied with the row addresses. Note that the forthcoming target address on the disk is known already when the row addresses are copied from leaf nodes, so that disk page addresses can be copied first to the disk address array 405 and the disk address offset can be inserted to the row address translation table 400 with each row address.

Thus the generated checkpoint image 410 comprises database table rows 335, leaf nodes 315 associated with the index 300, 305 of the database table rows, the row address translation table 400, the disk address array 405, and the relation identifier directory.

FIG. 4 details the row address translation table 400 and a disk address array 405. The values specified in the first row of the row address translation table 400 refer to positions in memory and the values specified in the second row refer to positions in the disk address array 405. For example value '0x9,2' in the row address translation table 400 means that the same row that is located in memory address 0x9 is copied to the disk address stored in the third position in the disk address array (daddr[2]) 405.

During a checkpoint operation, tuple addresses (row addresses) and offsets to their corresponding disk page numbers in disk address array 405 are stored in the row address translation table 400.

Once the checkpoint image 410 has been created, a restore component 245 will use the latest version of checkpoint image 410 in the event of a database failure. FIGS. 5, 6, 7, and 8 explain an embodiment of this process.

When storage pages are reconstructed in memory 135 by the restore, the primary index 600 (see FIG. 6) is fully restored since each of the row pointers have been refreshed while row pointers are loaded from the checkpoint image 410 to in-memory storage pages 135. The secondary index 605 still comprises deprecated, 'before checkpoint', pointers. The secondary index 605 is, however, fully operable because 'before-checkpoint' pointers can be associated with current row locations through the translation address table 400. Row pointers in the secondary index 605 can be refreshed on demand while database rows are accessed via an index or in a separate batch operation.

An embodiment of the restore process will now be explained.

At step 800, the latest version of a checkpoint image 410 is located on the secondary storage disk 105 by the restore component 245 and loaded into main memory 135.

At step 805, the relation identifier directory is read from the checkpoint image 410 into memory 135.

At step 810, the restore component 245 identifies a row address translation table 400 and proceeds to read the information contained within this table. The address translation table 400 is ordered by 'before checkpoint' row addresses.

Then the leaf node pages 620, 625 of the primary index 600 and secondary index 605 are read at step 815.

At step 820, the smallest key value of each leaf node page 625 is inserted into an index, which creates a skeleton of the secondary index 605, making it possible to access database rows.

Step 820 also inserts the smallest key value of each leaf node page 620 of primary index 600 into an index, which creates a skeleton of the primary index 600, making it possible to access database rows through it.

At step 825, the checkpoint image pages 410 comprising database rows are read into memory 135 in the order as listed in the disk address array 505. The contents of disk address array 505, comprising addresses of disk pages in the checkpoint image 410, are replaced with addresses of storage tuple pages in memory 700. As a result, the 'before-checkpoint' direct pointers of address translation table 400 become associated with 'after-checkpoint' in-memory tuple (logical) page addresses. (A logical page means a group of rows that are not located physically next to each other in a page-size memory segment. However, the combined size of the rows in a logical page is less than or equal to the size of a memory block.)

At step 830, on creation of in-memory storage tuple pages, the primary index 600 is scanned through and each 'before checkpoint' row pointer is replaced by an 'after checkpoint' row pointer. 'After checkpoint' row pointers are acquired by navigating to in-memory storage pages 500 by using 'before checkpoint' row pointers, the row address translation table 400, and the disk address array 505, in order to search for the corresponding row from the storage page, at step 835.

The 'before checkpoint' direct pointers in secondary indexes 305 are replaced with 'after checkpoint' direct pointers one by one, either in an 'on-demand' fashion or in a batch update, at step 840.

When storage pages are constructed in memory 135, the primary index 600 is fully restored since each of the row pointers have been freshened while row pointers are loaded from the checkpoint image 410 to in-memory storage pages 135. The secondary index 605 still comprises deprecated, 'before checkpoint' pointers. The secondary index 605 is, however, fully operable because 'before checkpoint' pointers can be associated with current row locations through the address translation table 400. Row pointers in secondary index 605 can be refreshed on demand while row pointers are accessed via an index or in separate batch operations.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain or store the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read only memory (ROM), a rigid magnetic disk, and an optical disk. Current examples of optical disks include compact disk read-only memory (CD-ROM), compact disk read/write (CD-R/W), and DVD.

Improvements and modifications can be made to the foregoing without departing from the scope of the present invention, based on the teachings disclosed herein.

The invention claimed is:

1. An apparatus for generating a checkpoint image of an in-memory database system, the apparatus comprising:
    a computer comprising a processor; and
    instructions which are executable, using the processor of the computer, to perform:
        identifying one or more storage pages which have been modified but not incorporated into a previous checkpoint image;
        for each identified storage page, identifying a direct memory reference and its offset which correspond to a secondary storage location;
        for each identified storage page, identifying one or more leaf nodes of a primary index and a secondary index and a memory address of each database table row identified in each of the identified leaf nodes;
        for each of the identified memory addresses of each database table row, identifying a relation identifier of a database table of each of the database rows; and
        writing the identified direct memory references, the offsets, a relation identifier directory, and the identified leaf nodes of the primary and secondary indexes to a checkpoint image.

2. The apparatus as claimed in claim 1, wherein the identified relation identifiers are stored in the relation identifier directory.

3. The apparatus as claimed in claim 1, further comprising a disk address array for storing the offsets of the direct memory references.

4. The apparatus as claimed in claim 1, further comprising a row address translation table for translation of direct memory addresses to secondary storage locations, the row address translation table being ordered by before-checkpoint tuple addresses, wherein the row address translation table is also written to the checkpoint image.

5. The apparatus as claimed in claim 1, wherein the leaf nodes are leaf nodes of a B+-tree.

6. The apparatus as claimed in claim 1, wherein the leaf nodes are leaf nodes of a hashed index data structure.

7. The apparatus as claimed in claim 1, wherein each identified direct memory reference and its offset, each identified relation identifier, and each identified leaf node of the primary index and the secondary index is buffered to a checkpoint buffer before writing to the checkpoint image.

8. The apparatus as claimed in claim 1, further comprising initiating a checkpoint operation and preventing updates to the primary index and the secondary index and the storage pages during the checkpoint operation.

9. The apparatus as claimed in claim 1, further comprising restoring a database from the checkpoint image.

10. A computer program for generating a checkpoint image of an in-memory database system, the computer program embodied on a non-transitory computer-readable storage medium and comprising computer program code operable, when loaded into a computer system and executed, to perform:
    identifying one or more storage pages which have been modified but not incorporated into a previous checkpoint image;
    for each identified storage page, identifying a direct memory reference and its offset which correspond to a secondary storage location;
    for each identified storage page, identifying one or more leaf nodes of a primary index and a secondary index and a memory address of each database table row identified in each of the identified leaf nodes;
    for each of the identified memory addresses of each database table row, identifying a relation identifier of a database table of each of the database rows; and
    writing the identified direct memory references, the offsets, a relation identifier directory, and the identified leaf nodes of the primary and secondary indexes to a checkpoint image.

* * * * *